Patented Apr. 8, 1930

1,753,517

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

METHOD OF TREATING LIQUID PARTIAL-OXIDATION PRODUCTS

No Drawing. Original application filed March 7, 1919, Serial No. 281,197. Divided and this application filed July 2, 1925. Serial No. 41,225.

This application forms a division of my copending application Serial No. 281,197, filed March 7, 1919, for Method of treating aldehyde fatty acid mixtures and products thereof.

In that and earlier applications, such as Serial No. 272,567, I have described partial combustion or oxidation methods for producing aldehyde fatty acids from ordinary liquid hydrocarbons occurring in petroleum, shale oil, or oils produced by the low temperature distillation of bituminous or cannel coals.

In such methods the liquid hydrocarbon is vaporized, mixed with air or an oxygen-containing gas in regulated proportions, near the theoretical combining proportion or preferably in excess thereof; and the hot mixture is passed, with or without the addition of a diluting gas such as steam, through a relatively thin layer or through successive relatively thin layers of catalytic material under a regulated temperature, preferably below 500° C. The catalysts employed are preferably complex oxides or compounds of metals having a varying valence, such, for example, as the blue oxides of molybdenum. The products of this partial combustion or partial oxidation process are then condensed, giving a mixture of partial oxidation products, ranging from alcohols, through aldehydes or aldehyde fatty acids. The process may be varied to produce more or less of the aldehyde fatty acids and of aldehydes.

The products thus obtained consist of a solution containing different aledhyde fatty acids mixed with aldehydes and unconverted hydrocarbons, the following being a typical example:

| | Per cent |
|---|---|
| Aldehyde fatty acids | 70 |
| Aldehydes | 25 |
| Hydrocarbons and undetermined | 5 |

These substances are soluble in each other through a wide range of proportions.

The object of the present invention is to separate the aldehyde fatty acids from the mixture and form industrial or commercial products from the acids and other constituents. In the preferred form of my method the production of compounds of the acids, and their separation from the rest of the mixture, are carried out in the same steps, though they may be carried out separately as later set forth.

In the preferred form, metallic salts (either soluble or insoluble) of the aldehyde fatty acids are formed; and the residual aldehydes and hydrocarbons are preferably returned for conversion into aldehyde fatty acids by the process of the applications above referred to. For example, if insoluble or slightly soluble soaps are desired, the solution or mixture of aldehyde fatty acids, aldehydes and hydrocarbons is agitated (preferably hot) with the hydroxide of the metal (such as lead or aluminum) until the aldehyde fatty acids have combined to form an insoluble or slightly soluble metallic soap. If a soluble salt of the metal is used, the reaction will be more rapid at first, but on account of the liberation of free mineral acid, metallic hydroxide should be added from time to time for its neutralization. The soap is then removed, as, for example, by filtering, and the residual solution or mixture of aldehydes, hydrocarbons, etc., is recovered.

A more rapid form of the above method is obtained by adding a sufficient quantity of a solvent, such as alcohol, to dissolve both the mixture and the metallic salt added. This solvent should be added before the metallic hydroxide (or metallic salt and metallic hydroxide) is added as above. When the reaction is completed (which may be hastened by warming), the alcohol is easily distilled off and the soaps removed by filtration or decantation.

When soluble alkali metal soaps of the aldehyde fatty acids are desired, such as sodium soap or potassium soap, the original mixture, containing a series of aldehyde fatty acids, aldehydes and hydrocarbons, is agitated with a water solution of the hydroxide, carbonate, or bicarbonate of the alkali metal. Heating will hasten the reaction, but a better color is obtained in the soap by carrying out the reactions at ordinary temperatures, this taking a longer time. When the reaction of neutralization has proceeded sufficiently near to completion, the agitation is stopped and the two liquids separate into layers.

The water solution of the aldehyde fatty acid soap comprising the lower layer can be drawn off, leaving the solution mixture of aldehydes, hydrocarbons, etc.

I may cause a more rapid saponification by first dissolving the original mixture of aldehyde fatty acids, aldehydes and hydrocarbons in alcohol and adding, either in the solid form or in a water solution or alcoholic solution, the carbonate, hydroxide, or bicarbonate of the desired alkali metal to be used. As before, the reaction may be hastened by heating.

When the reaction is completed, the alcohol can be recovered by distillation, and the solid or pasty soaps separated from the unchanged oily residuum by filtration or by first dissolving in hot water and separating, as in the above example of making insoluble soaps.

I have also found another practicable and economic procedure for separating the aldehyde fatty acids in the form of their alkaline metal salts (soap). In this process, the reaction mixture (aldehyde fatty acids, aldehydes, hydrocarbons, etc.) is heated to a suitable temperature, say above 100° C., with the addition of dry solid hydroxide, carbonate or bicarbonate of the particular metal, the salt of which is desired. The mixture is preferably agitated during this step, either by mechanical or convection current devices.

The soap formed in this reaction will largely separate from the mixture on cooling, and can be removed mechanically, fresh mixture being added and the treatment continued as long as possible. The non-saponifiable matter is preferably taken back to the oxidation process for re-treatment into aldehyde fatty acids.

In the same manner (dry additions with beating), I can prepare insoluble metallic soap, the addition in this case being preferably that of approximately equimolecular proportions of the chloride or other salt of the metal and the hydroxide. The metallic soap separating on cooling can be easily removed mechanically and the treatment continued with fresh additions of the mixture as long as practicable.

The calcium soap produced from aldehyde fatty acids which are soluble in water are especially valuable, having approximately the same solubility as the sodium soaps of higher fatty acids.

In the above examples, the acid compounds are formed before or during separation from the aldehydes, hydrocarbons, etc. I may, however, within my broader claims, separate the aldehyde fatty acids from the remainder of the original mixture before forming their compounds. Thus, I may distill off the aldehydes and hydrocarbons, which are more volatile than the aldehyde fatty acids, and then treat the separated acids to form their compounds. The distillation may be carried out with or without the aid of steam or other diluent.

In this divisional case I intend to cover the steps of removing at least a part of the acids from the original condensed liquid product mixture and then returning at least a part of the remaining liquid for further partial oxidation treatment substantially the same as that originally used on the liquid hydrocarbons. Here again a portion of the product is vaporized, mixed with oxygen and passed through a conversion zone, (preferably in the presence of catalysts such as those named, at a temperature below a red heat, thus giving a further conversion of the already partly oxidized material. I also intend to cover removing some of the constituents of the partial oxidation product mixture and further oxidizing part of the separated constituents, whether in the vapor phase as above described or in other ways.

Many variations may be made in carrying out the process without departing from my invention, as defined in the claims.

I claim:

1. The method of treating a partial oxidation product of mineral oil containing aldehyde fatty acids, consisting in separating at least a material portion of the acids from the other constituents of the partial oxidation product, and subjecting at least a material portion of the other constituents to partial oxidation with oxygen while in the vapor phase.

2. The method of treating a partial oxidation product of mineral oil containing aldehyde fatty acids, consisting in separating the free acids from the other constituents, and subjecting other constituents to partial oxidation with oxygen while in the vapor phase.

3. The method of treating a partial oxidation product of mineral oil containing aldehyde fatty acids, consisting in forming metallic soaps of the acids, separating these soaps, and subjecting other constituents to partial oxidation with oxygen while in the vapor phase.

4. In the treatment of a mixture of hydrocarbons including aliphatic hydrocarbons which already contain artificially-introduced chemically-combined oxygen to different degrees of oxidation, the steps consisting of separating more highly oxidized bodies from less highly oxidized bodies, and then further partially oxidizing some of the separated less highly oxidized bodies.

5. The method of treating a partial oxidation product of mineral oil containing aldehyde fatty acids, consisting in separating part of the constituents from the other constituents of the partial oxidation product, and further oxidizing some of the separated constituents.

6. The method of treating a partial oxidation product of mineral oil, containing aldehyde fatty acids, consisting in separating at least a material portion of the acids from the other constituents of the partial oxidation product, and subjecting at least a material portion of the other constituents to partial oxidation.

7. In the treatment of a partial oxidation product containing alcohols, aldehyde-like bodies, and acids, the steps consisting of separating more highly oxidized bodies from less highly oxidized bodies, and further partially oxidizing some of the separated less highly oxidized bodies 8. In the treatment of a mixture of hydrocarbons including aliphatic hydrocarbons which already contain artificially-introduced chemically-combined oxygen to different degrees of oxidation, the steps consisting of separating more highly oxidized bodies from less highly oxidized bodies, chemically treating some of the more highly oxidized bodies, and further partially oxidizing some of the separated less highly oxidized bodies.

In testimony whereof I have hereunto set my hand.

JOSEPH HIDY JAMES.